United States Patent Office 2,810,189
Patented Oct. 22, 1957

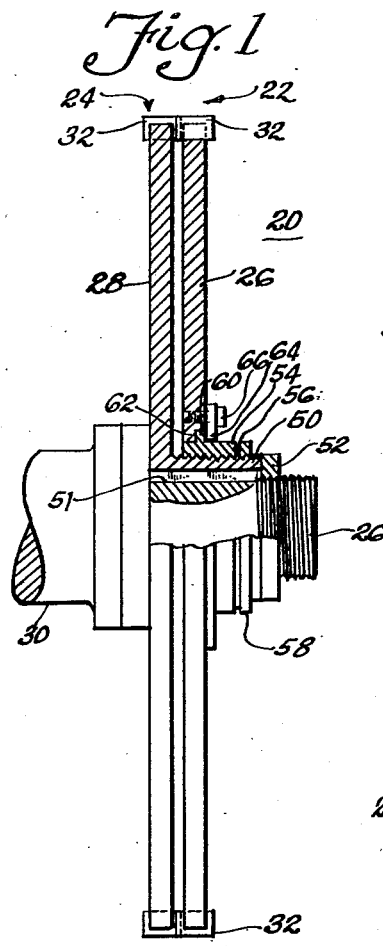
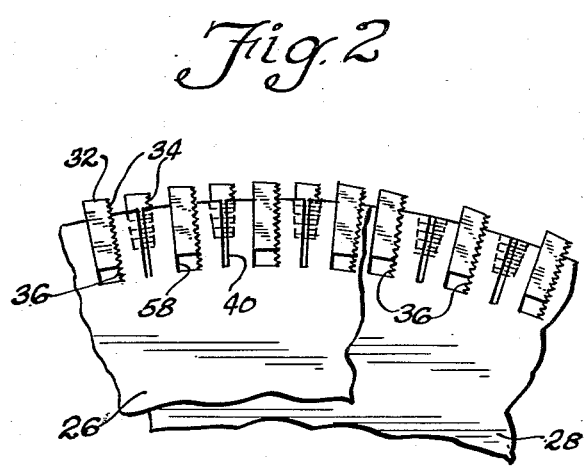
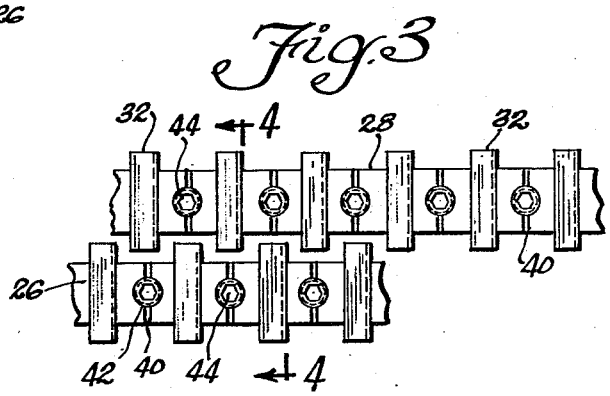
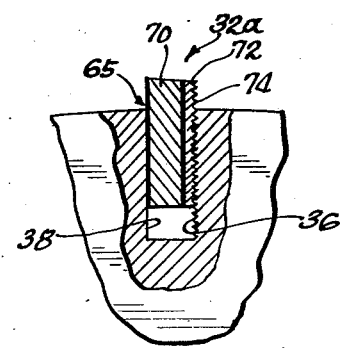
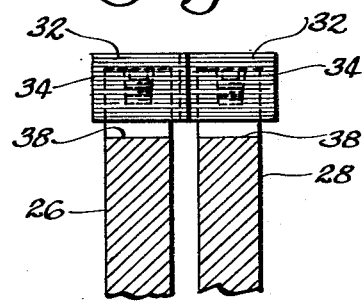

2,810,189

MILLING CUTTERS

Theodore S. See, Hammond, Ind., and Horace A. Frommelt, Milwaukee, Wis., assignors to La Salle Steel Company, Chicago, Ill., a corporation of Delaware Application February 24, 1953, Serial No. 338,393

4 Claims. (Cl. 29—103)

This invention relates to milling cutters and more particularly to a new and improved slotting cutter which is both radially and axially adjustable and which is also capable of being used as a slab mill cutter.

While cutters embodying the present invention are not limited thereto, they are particularly designed for and are highly useful in carrying out high speed machining operations of the type described and broadly claimed in Patent No. 2,581,449, issued January 9, 1952, in the name of Theodore S. See and entitled, "High Speed Machining of Ferrous Materials." As explained in the See patent, it was, prior to the invention therein disclosed and claimed, considered uneconomical and impractical, if not impossible, in the metal removal art and, particularly, in the machining or milling of ferrous work pieces to operate the cutters relative to the work at speeds as high as would be desirable because of the destruction or undue wear of the cutters after relatively short periods of operation at such high speeds.

In machining ferrous work pieces utilizing the methods disclosed in the See patent identified above, the cutters are operated at surface foot rates far in excess of anything theretofore believed possible, are provided with greatly increased numbers of cutting teeth by virtue of the employment of a much smaller tooth spacing or tooth pitch than was theretofore believed practicable, and are so constructed as to eliminate the tooth vibrations theretofore thought to be inevitable. Consequently, by the combination of these factors and by employing work piece feed rates correlated to the increased surface foot rates and minimum tooth pitch so as to maintain the proper chip load, a machining operation may be conducted at extraordinarily high speeds without reducing or shortening the cutter life. However, in view of the high operating speeds, it is necessary that milling cutters be designed and provided which will eliminate the tendency of the cutting elements to be displaced from the milling head in response to the large centrifugal forces produced by the high speed rotation. This tendency to be displaced is aggravated in the construction and operation of milling heads of large diameter, particularly when it is considered that all of the above criteria with respect to improved operating characteristics must be fulfilled.

In particular, slotting cutters designed to cut a slot of a predetermined width and depth in a work piece are subject to the inherent disadvantage that after a period of use, the side cutting edges which determine the width of the slot become worn down or abraded away with the result that the width of the slot cut in the work piece is less than the desired dimension. At present, this reduction in width may only be compensated for by replacing the plurality of cutting elements providing the side cutting edges.

Concurrently with the reduction in slot width, a similar wearing down of the outer cutting surface of the milling cutter reduces the depth of the slot provided. This deviation from proper dimension may be remedied by moving the work piece radially inwardly relative to the cutter but is, in its very nature, time consuming and conducive to error inasmuch as it is difficult to determine the reduction in outer diameter of the cutter during operation.

Accordingly, one object of this invention is to provide a milling cutter having cutting teeth or elements mounted on the cutter body in such a manner as to minimize vibrations and having a predetermined minimum pitch to permit operation at high surface foot rates.

Another object is to provide an improved milling cutter in which each of a plurality of individual cutting elements may be firmly secured in an adjusted position and in which it is possible to remove these cutting elements for reconditioning with a minimum expenditure of time and effort.

A still further object of this invention involves the provision of a milling cutter head in which the individual cutting elements thereof are both positively secured against displacement from the head in response to centrifugal force and mounted so as to be free from undesired vibratory forces.

Another object is to provide a new and improved slotting cutter in which both the depth and width of the slot produced by the cutter is capable of being adjusted in a simple manner.

Another object of this invention is to provide a slotting cutter in which each of a plurality of individual cutting elements positioned about the periphery of the cutter is capable of being adjusted in a radial direction.

A still further object of this invention is to provide a milling cutter utilizing a pair of axially adjustable supporting members carrying cutting elements whereby slots of different width may be produced by a single cutter.

In accordance with these other objects, the invention comprises a milling cutter including a pair of axially spaced circular plates having individual cutting elements secured adjacent the outer periphery of each of the plates. The cutting elements and the slots in the plates in which the elements are received are both provided with serrations so that the cutting elements may be secured in any one of a plurality of desired radial positions with respect to the axis of rotation of the plates. The two plates are movably secured to an actuating shaft with the plurality of cutting elements on the two plates interdigited to provide a single composite cutting surface including the cutting surfaces of both of the plurality of cutting elements. The two plates are movable relative to each other in such a manner that they may be secured in a variety of spaced positions so that the side cutting edges of the cutting elements produce a slot in a work piece of adjustable width. Each of the cutting elements is covered with a vibration damping material to prevent vibratory destruction of the cutting edges formed on each of these elements.

For a more complete understanding of the invention, reference should now be had to the drawings in which:

Fig. 1 is a front elevational view partially in section showing a slotting cutter embodying the present invention;

Fig. 2 is a fragmentary side elevational view on a larger scale and in partial section showing the interdigited cutting elements of the cutter shown in Fig. 1;

Fig. 3 is a fragmentary top elevational view showing the interdigited cutting elements;

Fig. 4 is a fragmentary sectional view taken along line 4—4 in Fig. 3; and

Fig. 5 is a fragmentary sectional view on a still larger scale of a modified form of the cutting element shown in Figs. 1 to 3.

Referring now to Figs. 1 to 4, inclusive, of the drawing, the invention is shown as embodied in a milling cutter 20 which comprises a pair of individual cutter assemblies 22 and 24 which respectively include circular supporting plates 26 and 28, secured to a shaft 30 for rotation thereby and adapted to support suitable cutting elements 32.

To secure the individual cutting elements 32 in any one of a plurality of desired radial positions relative to the axis of the shaft 30, the cutting elements 32, which may be formed of any desirable material such as carbide, are provided on one surface thereof with a plurality of serrations 34 which cooperate with a plurality of similar serrations 36 formed on one wall of each of a plurality of radially extending slots 38 in the plates 26 and 28. The carbide inserts or cutting elements 32 may be formed with the serrations 34 prior to a final sintering operation so that they may be more easily fabricated.

To provide a means for securing the cutting elements 32 in the desired positions in the slots 38, a thin slit 40 is provided between each pair of slots. The slits 40 are positioned to intersect suitable tapped apertures 42 in the plates 26 and 28 adapted to receive wedging screws 44. After the cutting elements 32 have been properly positioned in the slots 38 with the serrations 34 and 36 in engagement, the screws 44 are tightened into the apertures 42 so as to peripherally displace the portion of the plates 26 and 28 interposed between the slots 38 and slits 40 and thereby to firmly engage the cutting elements 32 interposed therebetween.

The cooperating serrations 34 and 36 and wedging screws 44 positively prevent outward radial displacement of the elements 32 due to centrifugal force, and also positively maintains these elements against inward radial displacement when the elements 32 are placed in cutting engagement with the surface of a work piece. Obviously, any one of the elements 32 may easily be replaced, or removed for a reconditioning operation, by merely removing or loosening the associated wedging screws 44 on either side of the selected cutting element.

To provide an outer cutting surface which includes the cutting edges of all of the plurality of elements 32, the plates 26 and 28 are so secured to the actuating shaft 30 that the elements on each of the two plates are interdigited with each other as shown in Figs. 2, 3 and 4 of the drawings. In this manner, although the pitch between successive elements 32 on a single one of the circular plates 26 or 28 may only be reduced to a value within the range normally used, the utilization of the interdigited members 32 produces a cutting surface having an effective pitch between subsequent cutting elements which is half of that between the individual teeth on a single one of the supporting plates. Therefore, a slotting cutter is provided which utilizes a low pitch between successive cutting elements 32 so that a large number of cutting edges are in engagement with a work surface at all times in accordance with the method set forth in the above entitled See patent.

To provide a slotting cutter capable of producing a slot of adjustable width, the circular plate 26 together with the cutting elements 32 secured thereto is movably mounted on the shaft 30 in such a manner as to be capable of axial adjustment. The supporting plate 28, which is fixedly secured to the shaft 30, is provided with an externally threaded and axially extending sleeve 50 having a keyway 51 for receiving a spline on the shaft, the sleeve 50 being engaged at one end by a lock nut 52 in order to secure the plate 28 in the desired position on the shaft 30. An internally threaded sleeve 54 is threadedly mounted on the sleeve 50 and secured in a desired position thereon by a lock washer 56 and a lock nut 58, and an outwardly extending flange 60 on the sleeve 54 engages a similarly formed flange 62 adjacent the inner edge of the plate 26. The flanges 60 and 62 are secured in this interlocking or engaged relationship by an annular ring 64 which is secured to the plate 26 by a plurality of spaced machine bolts 66.

Since the supporting plate 26 is adjusted axially relative to the plate 28 by rotating the sleeve 54, and since the plate 26 is prevented from rotating because of the interdigited cutting elements 32, the flanges 60 and 62 provide a sliding interconnection between the sleeve 54 and plate 26 when the ring 64 is loosened by releasing bolts 66. When the bolts 66 are tightened, the plate 26 is rigidly secured to the sleeve 54 and moves therewith.

In order to adjust the position of the supporting plate 26 relative to the supporting plate 28, the lock nut 58 is loosened and the bolts 66 are loosened so that the sleeve 54 is free to rotate on the sleeve 50 independent of the plate 26, thereby to move the plate 26 in an axial direction. When the plate 26 is moved to a proper position relative to the plate 28 to provide a distance between the outer edges of the cutting elements 32 equal to the width of the slot to be cut, the machine bolts 66 are tightened to rigidly interconnect the sleeve 54 and the plate 26. Following this, the lock nut 58 is tightened into engagement with the sleeve 54 to secure this sleeve in the adjusted position.

In order to minimize or eliminate the harmful effects of vibration, each of the cutting elements 32 is provided with a coating of a vibration absorbing or damping material 65 (Fig. 5) such as "Selectron" which is a synthetic resin. "Selectron" is an unsaturated polyester resin which is thermo-setting in character and possesses little or no resiliency after being cured. Basically, the "Selectron" resins are composed of (a) a polyester of a glycol with an ethylenically unsaturated polycarboxylic acid or a mixture of such acid and a polycarboxylic acid free of ethylenic unsaturation, and (b) a compound polymerizable therewith and containing a $CH_2=C<$ group.

Since "Selectron" possesses thermo-setting characteristics, any heat generated in the cutter 20 during the milling operations serves to strengthen the internal structure of the damping material and to prevent distortion of this material with its attendant reduction in damping qualities. "Selectron" is sufficiently strong to provide a secure mounting for the cutting teeth, having a compression strength of 21,000–23,000 p. s. i., a tensile strength of 7,000–8,000 p. s. i., and a modulus of elasticity in flexure of $5.5 \times 10^5$ p. s. i. This damping material also has a low linear coefficient of thermal expansion, $4$–$5 \times 10^{-5}$ inches per ° F., so that the heat produced by operation of the cutter 20 does not produce undesired internal stresses or displacement of the cutting teeth. "Selectron's" freedom from damage due to shock or impact is evident from its Barcol hardness rating of 45–50, a Rockwell M scale hardness rating of 110–115, and a notched Izod impact strength of .17 foot-pounds. If it is desired to increase the vibration damping effect, the inner surfaces of the slots 38 may also be coated with the "Selectron" material 65.

A modified form of cutting element is shown in Fig. 5 wherein only a body portion 70 comprising the cutting edges of a cutting element 32a is formed of the carbide material, and the trailing surface of the element 32a is provided with a brass or other metallic plate 72, one surface of which is secured to the carbide insert 70 by any suitable means such as brazing, and the other surface of which is provided with a plurality of serrations 74 which are adapted to cooperate with the serrations 36 formed in each of the plurality of slots 38. These modified elements 32a are secured in an adjusted position in the plates 26 and 28 in the same manner as the cutting elements 32 which are formed entirely of carbide or a similar cutting tool material.

In operation, the two supporting plates 26 and 28 are secured in a desired axial position with the side cutting edges spaced a distance apart which is equal to the width of the slot to be cut. The plate 26 is then secured in this adjusted position by tightening the machine bolts 66 and the locking nut 58. Also, before securing the machine bolts 66, the plate 26 is rotated relative to the sleeve 54 to insure that the cutting elements 32 carried thereon are positioned approximately midway between successive elements 32 on the plate 28 (Fig. 3).

When it becomes necessary to readjust the width of the slot provided by the cutter 20, the lock nut 58 and the machine bolts 66 are loosened to permit the sleeve 54 to be rotated to move the plate 26 in an axial direction to the right as shown in Fig. 1 in order to restore the distance between the side cutting edges to the original dimension desired. Thereupon, machine bolts 66 and locking nut 58 are tightened to secure the plate in this adjusted position. If, at this time, it is necessary to regrind, replace, or redimension any of the plurality of cutting elements 32, the wedging screws 44 positioned on either side thereof are loosened to release the desired cutting elements 32 from engagement with the serrations 36. These cutting elements 32 may then be removed and replaced by new elements 32 or reconditioned by grinding in a suitable jig and subsequently replaced within the slots 38. The wedging screws 44 are tightened to clamp the replaced elements 32 in their adjusted positions, and if necessary, each of the cutting assemblies 22 and 24 may be ground to a final outer diameter preparatory to placing the cutter 20 in service once again.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. A milling cutter comprising a rotatable supporting shaft, a pair of spaced-apart supporting members disposed in parallel planes extending perpendicularly to the axis of rotation of said supporting shaft, mounting means for adjustably positioning said supporting members relative to each other along the axis of rotation of said shaft, and cutting elements secured to the outer periphery of each of said supporting members, the cutting elements on one of said supporting members being disposed between and partially overlapping adjacent ones of the cutting elements on the other of said supporting members.

2. A milling cutter as claimed in claim 1, wherein said mounting means includes parts rotatable relative to each other to permit adjustment of said supporting members relative to each other along the axis of said shaft without relative rotation between said supporting members, thereby to change the extent of overlap of said cutting elements, and means for preventing relative rotation between said parts.

3. A milling cutter as claim in claim 1, wherein said mounting means includes engaged parts rotatable relative to each other to permit adjustment of said supporting members relative to each other along the axis of said shaft without relative rotation between said supporting members, thereby to change the extent of overlap of said cutting elements, and clamping means for clamping said parts into engagement, thereby to prevent relative rotation therebetween.

4. A milling cutter comprising a rotatable supporting shaft, a pair of spaced-apart supporting members carried by said shaft, mounting means for adjustably positioning said supporting members relative to each other along the axis of rotation of said shaft, and cutting elements secured to the outer periphery of each of said supporting members, the cutting elements on one of said supporting members being disposed between and partially overlapping adjacent ones of the cutting elements on the other of said supporting members, said mounting means including parts rotatable relative to each other to permit adjustment of said supporting members relative to each other along the axis of said shaft without relative rotation between said supporting members, thereby to change the extent of overlap of said cutting elements, and means for preventing relative rotation between said parts.

References Cited in the file of this patent

UNITED STATES PATENTS

| 427,386 | Wheeler | May 6, 1890 |
| 447,900 | Pallen | Mar. 10, 1891 |
| 1,422,988 | Kienzl | July 18, 1922 |

FOREIGN PATENTS

| 129,138 | Great Britain | July 10, 1919 |
| 359,355 | Germany | Sept. 20, 1922 |